US008160361B2

(12) United States Patent
Boness

(10) Patent No.: US 8,160,361 B2
(45) Date of Patent: Apr. 17, 2012

(54) METHOD FOR THE DETECTION OF MARKS AND PRINTING MACHINE

(75) Inventor: Jan D. Boness, Bad Bramstedt (DE)

(73) Assignee: Eastman Kodak Company, Rochester, NY (US)

( * ) Notice: Subject to any disclaimer, the term of this patent is extended or adjusted under 35 U.S.C. 154(b) by 1403 days.

(21) Appl. No.: 10/589,656

(22) PCT Filed: Feb. 14, 2005

(86) PCT No.: PCT/EP2005/001466

§ 371 (c)(1), (2), (4) Date: Aug. 16, 2006

(87) PCT Pub. No.: WO2005/077658

PCT Pub. Date: Aug. 25, 2005

(65) Prior Publication Data

US 2007/0175351 A1 Aug. 2, 2007

(30) Foreign Application Priority Data

Feb. 16, 2004 (DE) ........................ 10 2004 007 367

(51) Int. Cl.
*G06K 9/18* (2006.01)

(52) U.S. Cl. ....................................... 382/184; 358/406

(58) Field of Classification Search .......... 358/400–498, 358/1.12, 364; 101/485; 382/112, 287, 317, 382/184; 271/226; 399/382, 388, 394, 395, 399/287, 289, 294

See application file for complete search history.

(56) References Cited

U.S. PATENT DOCUMENTS

| | | | | | |
|---|---|---|---|---|---|
| 4,673,285 | A * | 6/1987 | Shogren | .......................... | 355/23 |
| 5,085,587 | A * | 2/1992 | DesForges et al. | ........... | 434/355 |
| 5,339,150 | A * | 8/1994 | Hubble et al. | .................. | 399/49 |
| 5,488,458 | A * | 1/1996 | Benedict et al. | ................ | 399/15 |
| 6,201,937 | B1 | 3/2001 | Folkins | | |
| 6,356,735 | B1 | 3/2002 | Hozumi | | |
| 2003/0029341 | A1 * | 2/2003 | Metzler | ......................... | 101/485 |

FOREIGN PATENT DOCUMENTS

| | | |
|---|---|---|
| DE | 19901635 | 7/2000 |

* cited by examiner

*Primary Examiner* — Benny Tieu
*Assistant Examiner* — Michael Tzeng

(57) ABSTRACT

The object of the invention is to achieve a correctly positioned print in duplex-printing mode. A method for the detection of marks (1, 1', 1") by a sensor array (10) for a printing machine has been provided, whereby the marks (1) on the first (recto) printing side (5) of a sheet (3) are detected, the sheet is turned over and shifted in a direction transverse to the transport direction, and the marks (1') on a second (verso) printing side (6) of said sheet are detected. Furthermore, a printing machine is provided with an alignment device (40) for shifting a sheet (3) in a direction transverse to the transport direction for the detection of marks (1') on the second printing side, said marks being offset relative to the marks (1) on the first printing side, after said sheet (3) has been turned over.

2 Claims, 2 Drawing Sheets

METHOD FOR THE DETECTION OF MARKS AND PRINTING MACHINE

BACKGROUND

The present invention relates to a method for the detection of marks and a printing machine.

SUMMARY

In the field of printing machines, the correctly positioned application of a printed image on a printing material is of considerable importance regarding the printing quality. Offset printing of one or more colors on the printing material is readily detected by the human eye and perceived as being negative. As a result, prior art has disclosed a large variety of suggestions to solve the problem of the correctly positioned application of a printed image on a printing material. Many suggestions use register marks or guide marks in order to determine essentially prior to the printing operation if the printed image of a given color has been applied to the desired site on the printing material or to determine the degree of potential shifting of the printed image on the printing material. The state of a printed image which has been applied in perfect alignment to the printing material is referred to as keeping register or as being in register, this traditionally relating to color printing. The shift of the printed image is detected in transport direction (in-track) and transversely with respect to transport direction (cross-track); in addition, an angular shift (skew) can be detected. The analysis is performed either manually by the operator of the printing machine with the use of measuring devices outside the printing machine or by sensor arrays inside the printing machine. Hereinafter, the latter situation will be given consideration. As a rule, the printing machine is calibrated with the use of marks, register marks or guide marks, i.e., adjustments are made on the printing machine which compensate for the shifting of the printed image during the printing operation following the calibration. A particular problem, which occurs especially in duplex-printing and with thin printing material, is that a mark on the underside shows through the printing material and the sensor array erroneously detects this mark as being on the upper side. This leads to calibration errors and ultimately to registering errors or guiding errors, as a result of which registration or alignment is no longer guaranteed.

The object underlying the present invention is to achieve a correctly positioned print in duplex-printing.

Embodiments are disclosed by the subclaims.

BRIEF DESCRIPTION OF DRAWINGS

Hereinafter, the invention will be described in detail with reference to drawings.

They show in

DETAILED DESCRIPTION OF THE INVENTION

Figure 1:
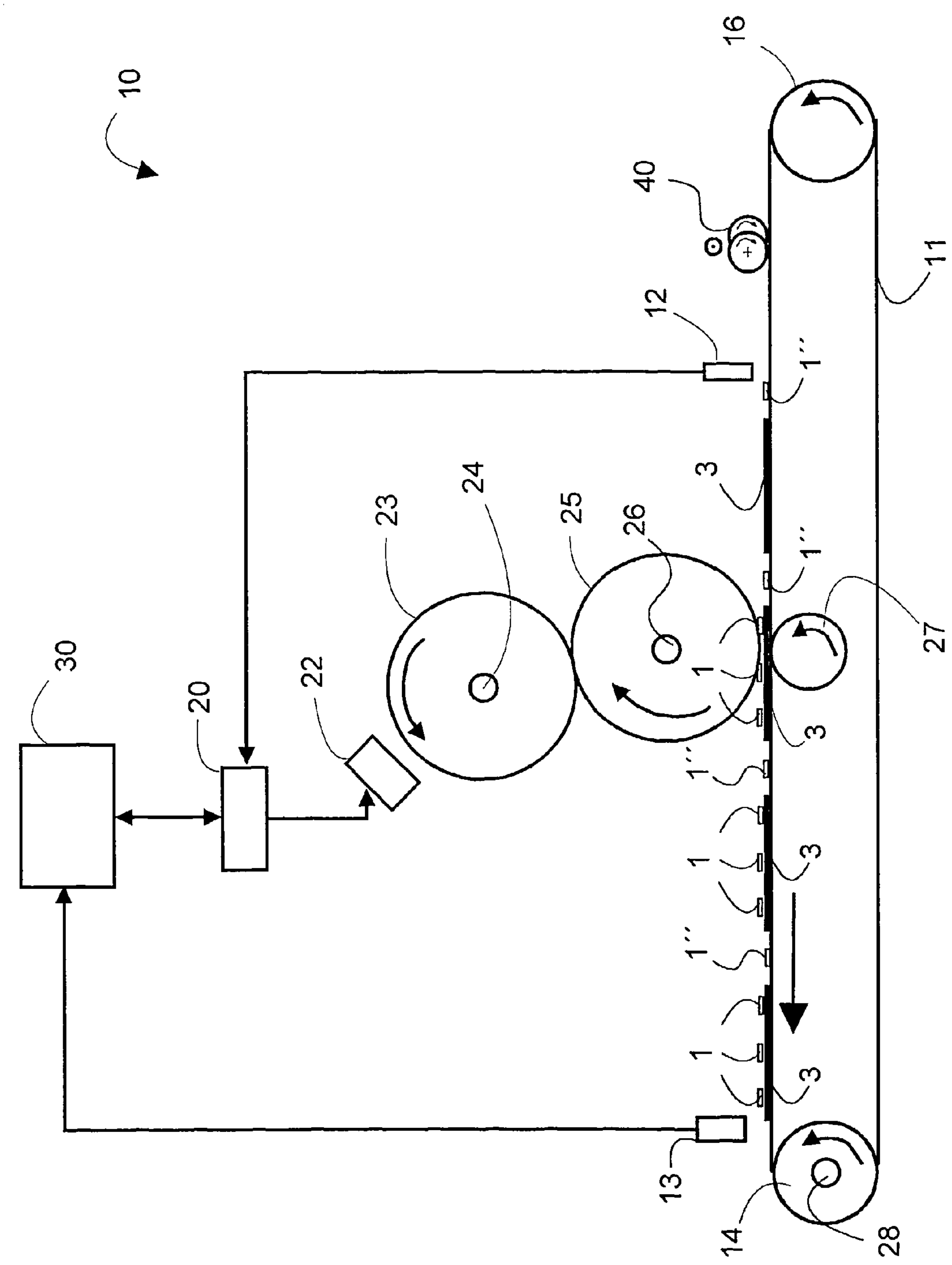
FIG. 1 a schematic side elevation of a part of a printing machine in order to explain the method of operation.

FIG. 1 shows a schematic block diagram of a printing module or printing unit above a transport belt 11 which moves in the direction of the straight arrow. Located upstream of the printing module or printing unit is an alignment device 40 for aligning a sheet 3 of printing material on transport belt 11. Alignment device 40 comprises essentially two rollers which contact sheet 3, roll off on said sheet and can be shifted in a controlled manner along said rollers' axis as indicated by the arrow, whereby sheet 3 is shifted at the same time. Alignment device 40 may also be referred to as an automatic sheet positioner. The printing module or printing unit applies one color to sheet 3 of the printing material; it is possible to provide additional printing modules for additional colors. Transport belt 11 is driven by a drive on a second deflecting roller 14 and transports sheets 3 through the printing machine. Usually, additional rollers which are not shown in FIG. 1, are arranged between the second deflecting roller 14 and the first deflecting roller 16. A first sensor 12 detects the leading edge of sheet 3 and transmits a signal to a clock pulse counter 20, which is connected with a correcting device 30. After a preset number of pulses of a third encoder 28 on the second deflecting roller 14, clock pulse counter 20 transmits a signal to the imaging unit 22, which, based on the signal, transfers an image to an imaging cylinder 23. The image is transferred to an intermediate cylinder 25, which rotates in a direction opposite that of imaging cylinder 23, and is printed on sheet 3 by intermediate cylinder 25, which rolls off on sheet 3. Intermediate cylinder 25 exerts a force from the top onto transport belt 11, and a pressure roller 27 exerts a counterforce from underneath transport belt 11 onto said belt. Imaging cylinder 23, intermediate cylinder 25, the first deflecting roller 16 and pressure roller 27 are driven by frictional connection with transport belt 11, said belt being driven by the drive of the second deflecting roller 14. Imaging cylinder 23 and intermediate cylinder 25 have a first encoder 24 and a second encoder 26, respectively, which determine the angle of rotation of imaging cylinder 23 and of intermediate cylinder 25, respectively, and, in this manner, allow the determination of the position of said cylinders. A third encoder 28 is located at the second deflecting roller 14 and determines said roller's angle of rotation. The imaging process, which is performed by imaging device 22 and has been triggered by clock pulse counter 20 as a result of the signal transmitted by the first sensor 12, takes place in an exactly timed manner so that the image is transferred by imaging cylinder 23 via intermediate cylinder 25 to sheet 3 with an accuracy within the micrometer range. The time which passes between the imaging operation of imaging cylinder 23 and the application of the image on sheet 3 is referred to as the delay time. In so doing, the concept "image" comprises individual image lines, image areas and color separation images. When printed on top of each other, color separation images of the individual colors of the respective printing modules ultimately make up the total color image on sheet 3. In so doing, errors may occur which cause the image not to be applied to the desired place on sheet 3, i.e., registering or guiding errors occur. In order to eliminate these errors caused by image or print shifting, at least one calibration run is provided prior to the actual printing operation. During different calibration runs, different register and/or guide marks are applied to sheet 3 and/or transport belt 11. Hereinafter, a specific calibration run will be described. In the present example, several register or guide mark patterns comprising a mark 1" for each color separation are applied to transport belt 11 and patterns comprising a mark 1, 1' for each color separation are applied to sheet 3. For example, a mark 1, 1', 1" consists of two black reference lines and respectively one line for the colors cyan, magenta, yellow and black, which, ideally, are printed consecutively at equal distances. The illustrated register mark pattern is used mainly for calibrating the printing operation of the printing machine in transport direction, i.e., in-track printing. Marks 1, 1' on sheet 3, as well as marks 1" on transport belt 11, usually are applied by the individual printing modules or printing units, one of them being shown schematically by FIG. 1. Clock pulse counter 20 counts a pre-determined number of pulses of the third encoder 28 on the second deflecting roller 14 and then sends a signal to a second sensor 13 located downstream of the printing modules, whereupon said sensor begins measuring. The leading edges of marks 1, 1', 1" are detected by the second sensor 13 which transmits a signal to clock pulse counter 20. In this specific embodiment, sensor array 10 essentially comprises the second sensor 13. In each case, clock pulse counter 20 counts a number of pulses of the third encoder 28 on the second deflecting roller 14 between the beginning of the measurement by the second sensor 13 and the detection of all the lines of mark 1, 1', 1" and then transmits the number of pulses to correcting device 30. In addition, correcting device 30 contains in its memory a nominal value of the distance of all lines of mark 1, 1', 1", starting with the measurement by the second sensor 13, as the appropriate number of pulses of the third encoder 28 on the second deflecting roller 14. The computed actual distance and the stored nominal value of the distance are used to determine the difference, which is the correction value. The aforementioned calibration process is preferably carried out several times for each color, whereby the obtained correction values for each color are averaged to determine an average correction value. In the correcting device 30, this final correction value is added to a delay value which corresponds to the delay period. Now clock pulse counter 20 contains a corrected delay value which corresponds to the delay value that has been modified by the final correction value and takes into account the influence of the aforementioned registering or guiding error. The obtained values are used for calibrating the printing machine; now the printing machine is essentially free of printing image shifts in transport direction and is ready for use.

Figure 2A:
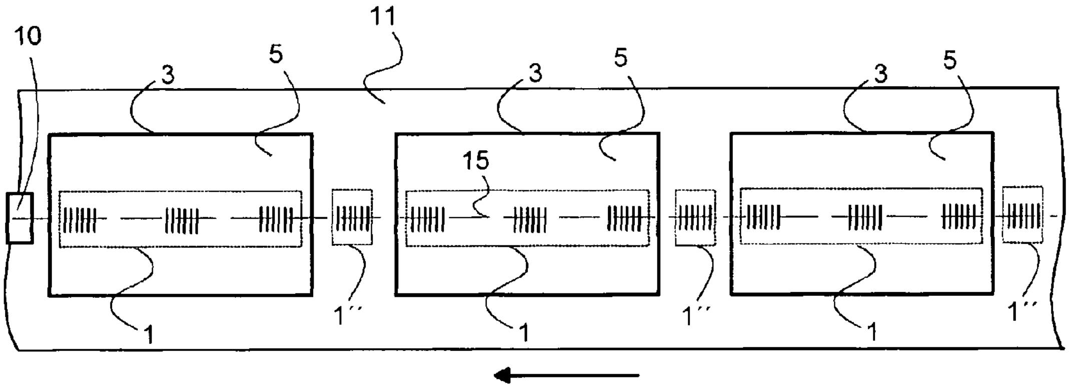
FIG. 2*a* a schematic plan view of a first (recto) printing side of a sheet on a transport belt.

FIG. 2*a* shows a schematic plan view of the first (recto) printing sides 5 of sheets 3, i.e., the first to be printed sides of a sheet 3, which are transported on the continuous transport belt 11 in the direction of the arrow, whereby a section of said belt is illustrated. At the end of transport belt 11, there is a second sensor 13 which detects marks 1, 1" as described above. Each of marks 1, 1', 1" consists of respectively six successive lines extending in a direction perpendicular to the transport direction, whereby the first two lines represent reference lines for the subsequent lines, and each of the subsequent four lines characterizes one color of the printing machine. Consequently, four colors of the printing machine are being calibrated in this example. Other types of marks, as well as colors, can be provided. Each sheet 3 has on its first printing side 5—facing upward here—three marks 1 which are applied at approximately equal distances from each other in the center of sheet 3: one mark 1 is applied close to the leading edge of sheet 3, another mark 1 to the center, and yet another mark 1 close to the trailing edge of sheet 3. If sheets 3 are small, two marks 1 are used per sheet 3. In FIG. 2*a*, marks 1 on the first printing side 5 are framed by dashed lines, i.e., respectively three marks 1 in one frame. Between sheets 3, marks 1" are applied to transport belt 11, said marks being of the same type as marks 1 on sheet 3. Likewise, marks 1" between sheets 3 are provided with a dashed-line frame, i.e., one mark 1" per frame. Transport belt 11 is divided longitudinally by a dashed center line 15 to create two halves, i.e., an upper half and a lower half. Sheets 3 are approximately centered on transport belt 11; due to this, marks 1 on sheets 3 and marks 1" on transport belt 11 are divided in the center by center line 15. One after the other, marks 1 on sheets 3 and marks 1" between sheets 3 on transport belt 11 are detected by sensor array 10—in this example by the second sensor 13, and sensor data are transmitted to correcting device 30 as described above. To achieve this, sensor array 10 is located above transport belt 11 approximately at the height of or in line with marks 1 on the first printing side 5 and marks 1" between sheets 3. The measuring window of sensor array 10 includes marks 1, 1". With the use of marks 1, 1", the registering and/or guiding stability of the printing machine is determined and the latter is calibrated. With the pictured marks 1, 1" the registering and/or guiding stability of the printing machine in transport direction, i.e., the so-called in-track status, can be determined.

Figure 2B:
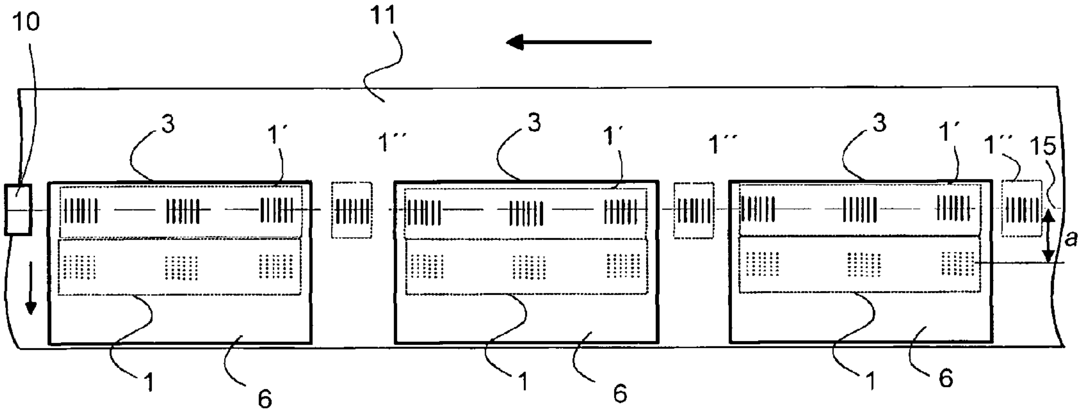
FIG. 2*b* a schematic plan view of a second (verso) printing side of the sheet which has been shifted with respect to FIG. 2*a* on the transport belt.

FIG. 2*b* shows a schematic plan view of the second (verso) printing sides 6 of sheets 3, i.e., the second to be printed sides of sheets 3, on transport belt 11. Sheets 3 have passed once through the printing machine and, considering FIG. 2*a*, have been turned over, so that the second printing sides 6 face upward and the first printing sides 5 having marks 1 face downward toward transport belt 11. Second printing sides 6 are provided with similar marks 1' which are framed by dashed lines, i.e., three marks 1' per frame, in this example. In alignment device 40, sheets 3, after having been turned over, are shifted perpendicular to the transport direction on transport belt 11, i.e., in the direction of the downward-pointing arrow. As is obvious from FIG. 2*b*, after having been shifted, sheets 3 are no longer centered on transport belt 11 but have been shifted by a certain distance a on transport belt 11. Now center line 15 of transport belt 11 no longer extends through the approximate center of sheets 3 but is closer to the lateral edges of sheets 3. Inasmuch as the shifting of sheets 3 takes place before the actual printing of the second printing sides of sheets 3, it has been ensured that marks 1' printed on the second printing sides 6 of sheets 3 and marks 1", which have been applied to transport belt 11 during the second printing of sheets 3, are aligned on one line viewed in transport direction. Now marks 1', 1" are in the measuring window of sensor array 10. Marks 1" on transport belt 11 are centered on transport belt 11, as in FIG. 2*a*. After sheet 3 has been shifted, sensor array 10 is located at the same height as marks 1' on the second printing side 6 and the fixed marks 1" between sheets 3 on transport belt 11, and detects said marks. In so doing, marks 1' on the second printing side 6 and marks 1" on transport belt 11 move through the measuring window of sensor array 10; marks 1 on first printing side 5 of sheets 3 move laterally past the measuring window of sensor array 10 because sheet 3 has now been shifted. In the present second passage of sheet 3, marks 1 on the first printing side 5 are no longer detected by sensor array 10. In view of this, if sheets 3 are not shifted, there is the risk—in particular when thin, fully or partially transparent printing materials are processed—that marks 1 on the first printing side 5 are detected by sensor array 10 and, as a result of this, the calibration of the printing machine is corrupted or prevented. This risk has been eliminated by the described shifting of sheets 3 in a direction transverse to the transport direction of transport belt 11.

The invention claimed is:

1. A method for the detection of three set of marks by a sensor array for a printing machine, comprising the steps of:

applying the first set of marks located on the first printing side of a sheet in the transport direction, substantially in line with the third set of marks located on a transport belt for the transporting of the sheet, detecting the first set of marks located on the first printing side of the sheet and turning over the sheet and shifting the sheet in a direction transverse to the transport direction such that the second set of marks located on the second printing side of the sheet are aligned in the transport direction, substantially in line with the third set of marks located on the transport belt, and thereafter detecting the second set of marks on the second printing side of the sheet.

2. A printing machine for duplex printing on a sheet having two sets of detection marks, with one set of marks located on each printing side of the sheet, comprising:

a sensor array for detecting the first set of marks on the first printing side of the sheet, a device for turning over the sheet, an alignment device for shifting the sheet in a direction transverse to the transport direction aligned in the transport direction, substantially in line with a third set of marks located on the transport belt, and after the sheet is turned over and shifted in a direction transverse to the transport direction, detecting the second set of marks on the second printing side of the sheet with said sensor array.

* * * * *